United States Patent
Antonini et al.

(10) Patent No.: US 12,385,464 B2
(45) Date of Patent: Aug. 12, 2025

(54) VARIABLE-PITCH IMPELLER FOR WIND TURBINES DEFINED BY A SLIDING RING

(71) Applicant: Zero3 Key S.r.l., Sasso Marconi BO (IT)

(72) Inventors: Marco Antonini, Sasso Marconi BO (IT); Francesca Sandrini, Sasso Marconi BO (IT)

(73) Assignee: Zero3 Key S.r.l., Sasso Marconi BO (IT)

( * ) Notice: Subject to any disclaimer, the term of this patent is extended or adjusted under 35 U.S.C. 154(b) by 0 days.

(21) Appl. No.: 18/562,386

(22) PCT Filed: Jun. 20, 2022

(86) PCT No.: PCT/IB2022/055695
§ 371 (c)(1),
(2) Date: Nov. 20, 2023

(87) PCT Pub. No.: WO2022/269453
PCT Pub. Date: Dec. 29, 2022

(65) Prior Publication Data
US 2025/0084824 A1 Mar. 13, 2025

(30) Foreign Application Priority Data
Jun. 22, 2021 (IT) .................. 102021000016355

(51) Int. Cl.
*F03D 1/06* (2006.01)
(52) U.S. Cl.
CPC ......... *F03D 1/0664* (2023.08); *F03D 1/0606* (2023.08); *F05B 2240/33* (2013.01); *F05B 2260/79* (2013.01)
(58) Field of Classification Search
CPC .... F03D 1/0602; F03D 1/0606; F03D 1/0664; F05B 2240/33
(Continued)

(56) References Cited

U.S. PATENT DOCUMENTS 1,555,349 A * 9/1925 Ballow ................. F03D 7/0224
  416/136
4,080,100 A * 3/1978 McNeese ............... F03D 1/025
  416/11
(Continued)

FOREIGN PATENT DOCUMENTS

DE 10360235 7/2005
DE 10360235 A1 * 7/2005 .......... F03D 1/0608
(Continued)

OTHER PUBLICATIONS

English Translation of De10360235A1 (Year: 2005).*
International search report and written opinion dated Sep. 23, 2022; Application No. PCT/IB2022/055695; 11 pages.

*Primary Examiner* — Courtney D Heinle
*Assistant Examiner* — Wesley Le Fisher
(74) *Attorney, Agent, or Firm* — Erik J. Overberger; Rankin Hill & Clark, LLP (57) ABSTRACT

An impeller for wind turbines comprises a rear ring having a central axis. The impeller comprises a front ring having an inner peripheral surface. The front ring is arranged coaxially and is slidably associated with the rear ring. The front ring is movable along the central axis and switches between a close configuration and a spaced apart configuration, with respect to the rear ring. The impeller comprises a plurality of blades connected to the front ring and defining a variable-pitch propeller. The blades being adjustable between a minimum pitch when the front ring is in the close configuration and a maximum pitch when the front ring is in the spaced apart configuration.

7 Claims, 6 Drawing Sheets

(58) Field of Classification Search
USPC ................... 415/4.5, 4.3, 2.1, 908; 416/189
See application file for complete search history.

(56) References Cited

U.S. PATENT DOCUMENTS

| | | | | |
|---|---|---|---|---|
| 4,178,124 | A * | 12/1979 | Puskas | F03D 1/04 |
| | | | | 415/75 |
| 4,213,734 | A * | 7/1980 | Lagg | F03B 17/061 |
| | | | | 416/41 |
| 6,246,126 | B1 * | 6/2001 | Van Der Veken | F03D 7/02 |
| | | | | 290/55 |
| 10,132,290 | B2 * | 11/2018 | Opaits | F03D 1/0691 |
| 2014/0017065 | A1 * | 1/2014 | Dale | F03B 3/126 |
| | | | | 29/889.23 |
| 2017/0145981 | A1 * | 5/2017 | Culpepper | F03B 17/061 |
| 2018/0306166 | A1 * | 10/2018 | Küster | F03B 3/04 |

FOREIGN PATENT DOCUMENTS

| | | |
|---|---|---|
| JP | 2009185806 | 8/2009 |
| NZ | 577517 | 11/2009 |

\* cited by examiner

VARIABLE-PITCH IMPELLER FOR WIND TURBINES DEFINED BY A SLIDING RING

The present disclosure relates to an impeller for wind turbines. The disclosure is useful in generators used for the production of wind energy.

Devices for producing wind energy, including horizontal-axis wind turbines, are known in the state of the art. These devices comprise a rotor comprising blades, e.g., three. The rotor is connected to a nacelle, which is positioned on top of a tower. The nacelle is capable of rotating with respect to the tower, so as to align itself with the direction of the wind. The rotor shaft is placed inside the nacelle, and is arranged to transmit the rotary motion of the blades to a gear transmission box. The gear transmission box transfers the movement to a further shaft, called the high-speed shaft, which drives an electric generator.

U.S. Pat. No. 1,555,349A describes a windmill configured to operate a pump. The windmill comprises a pair of coaxial rings spaced apart from each other and blades arranged radially between the pair of rings, with an arcuate shape. Furthermore, the windmill comprises springs which connect the pair of rings and which are configured to contract, bringing the pair of rings closer together. Furthermore, during the contraction of the springs, the blades are reoriented, increasing the exposed area.

SUMMARY OF THE DISCLOSURE

Disadvantageously, the energy production according to the prior art depends on two factors: wind speed and the actual area of the disc formed by the blades during rotation. To optimize the performance of the device, a considerable wind speed is necessary, not present at ground level: therefore, the blades must be installed at considerable heights. Furthermore, large blades must be used to maximize the actual disc area. Due to these operating conditions, the transportation and installation of the device are complicated.

In this context, the technical task underlying the present disclosure is to propose an impeller for wind turbines which overcomes the drawbacks of the prior art mentioned above.

In particular, it is an object of the present disclosure to provide an impeller for wind turbines whose power produced is maximized even when the wind speed is not optimal.

A further object of the present disclosure is to provide an impeller for wind turbines which, for the same power produced, requires smaller blades.

The mentioned technical task and the specified aims are substantially achieved by an impeller for wind turbines, comprising the technical specifications set out in one or more of the appended claims.

In particular, an impeller for wind turbines according to the present disclosure comprises a rear ring having a central axis.

A front ring has an inner peripheral surface and is arranged coaxially with respect to the rear ring and is slidably associated with the rear ring. The front ring is movable along the central axis; it varies between a close configuration and a spaced apart configuration, with respect to the rear ring.

A plurality of blades is connected to the front ring and define a variable-pitch propeller. The blades are adjustable between a minimum pitch, when the front ring is in the close configuration, and a maximum pitch, when the front ring is in the spaced apart configuration.

A shaft extends along the central axis. Said shaft includes a rear portion connected to the rear ring and a front portion connected to the front ring. The front portion of the shaft is configured to perform a rotational translation movement with respect to the rear portion to switch the front ring between the close configuration and the spaced apart configuration and has a front cavity extending along the central axis. The rear portion of the shaft is at least partially inserted in the front cavity.

The front portion comprises at least one spiral guide arranged on an inner surface. The rear portion comprises at least one slider associated with the spiral guide and arranged on an outer surface.

Such an impeller for wind turbines solves the technical problem, as the impeller is capable of optimizing its configuration according to the wind speed. In fact, the front ring, translating along the central axis, changes the pitch of the blades. Thereby, the angle of incidence of the air flow is adjusted, allowing a maximized energy production even at reduced wind speeds. Advantageously, the impeller does not need large blades: being able to optimize the inlet air flow, the impellers can be built with smaller dimensions with the same power produced.

LIST OF FIGURES

Further features will become more apparent from the description of an exemplary, but not exclusive, and therefore non-limiting preferred embodiment of an impeller for wind turbines, as illustrated in the appended figures, in which.

DETAILED DESCRIPTION

With reference to the appended figures, 1 refers to an impeller for wind turbines according to the present disclosure.

Figure 3:
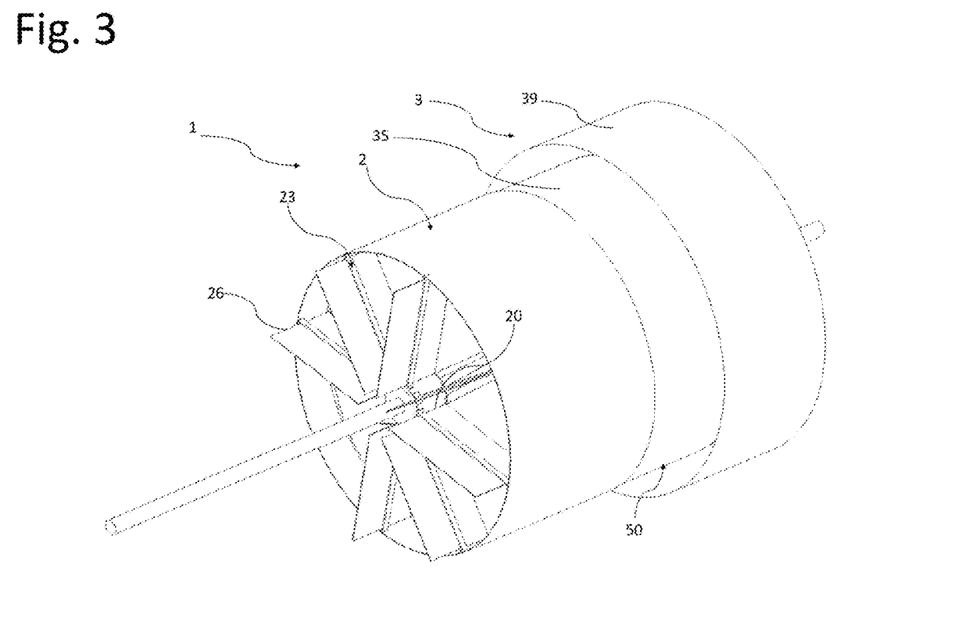
FIG. 3 is a perspective rear view of the impeller of FIGS. 1 and 2.

As shown in FIG. 3, the impeller 1 comprises a front ring 3, from which the air flow enters, and a rear ring 2, from which the air flow flows outwards. The impeller 1 also has a central axis X.

Figure 5:
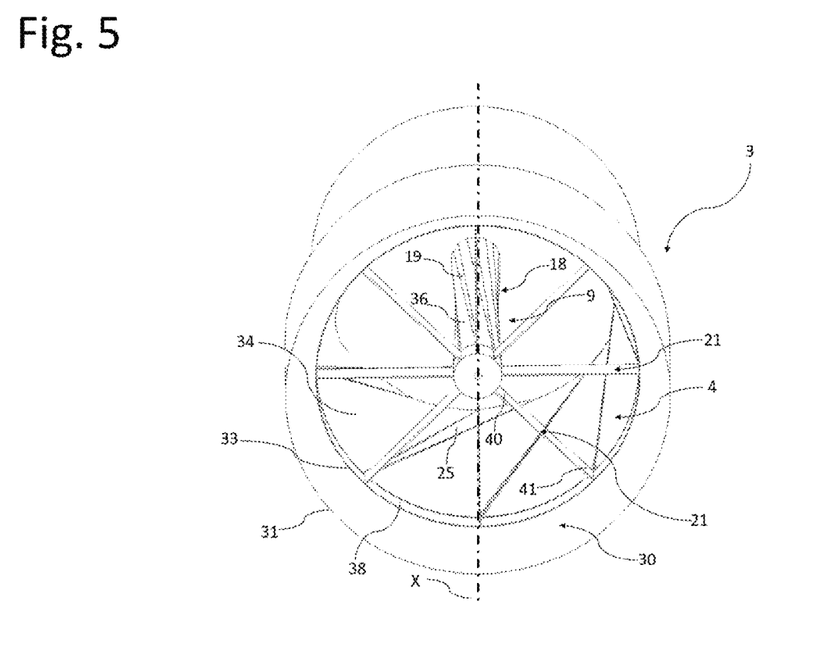
FIG. 5 is a perspective front view of a first detail of the impeller of FIGS. 1 and 2.

As shown in FIG. 5, the front ring 3 has a converging portion 30, with a truncated cone shape, for conveying the air flow towards the inside of the impeller 1. In particular, the converging portion 30 has an inlet section 31 defined at the front edge of the front ring 3. The converging portion 30 has an intermediate section 33, positioned inside the front ring 3 and having a smaller area with respect to the inlet section 31. A cylindrical portion 38 is connected to the converging portion 30. The cylindrical portion 38 has the same diameter as the smaller section 33 of the converging portion 30 and extends along the central axis X.

Figure 1:
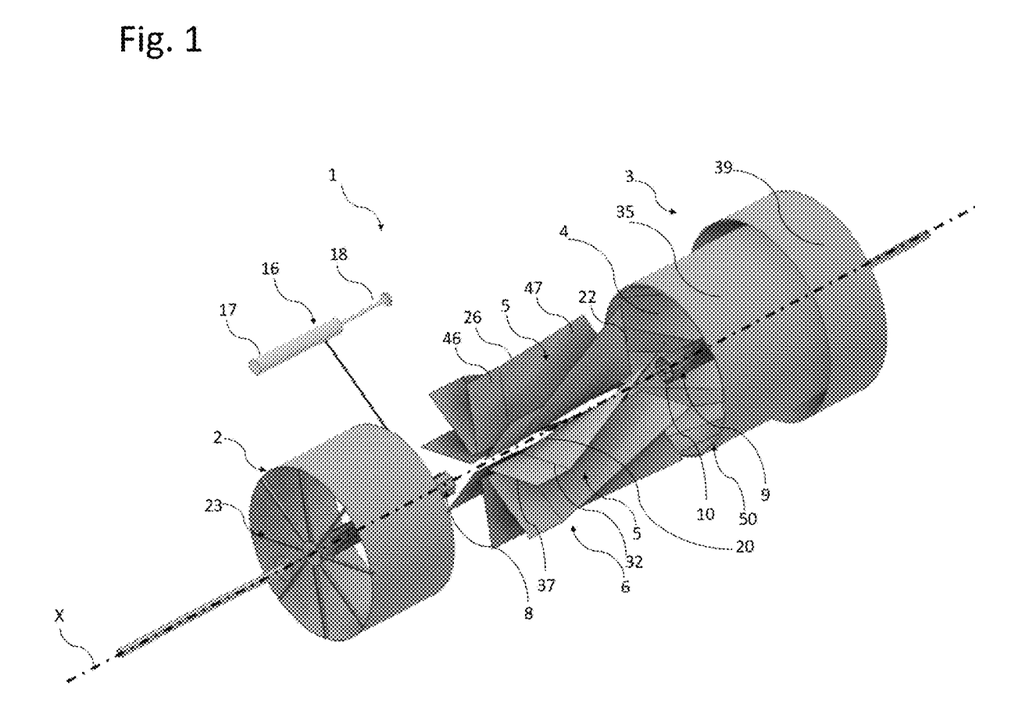
FIG. 1 is a perspective, exploded view of an impeller according to the present disclosure.
Figure 2:
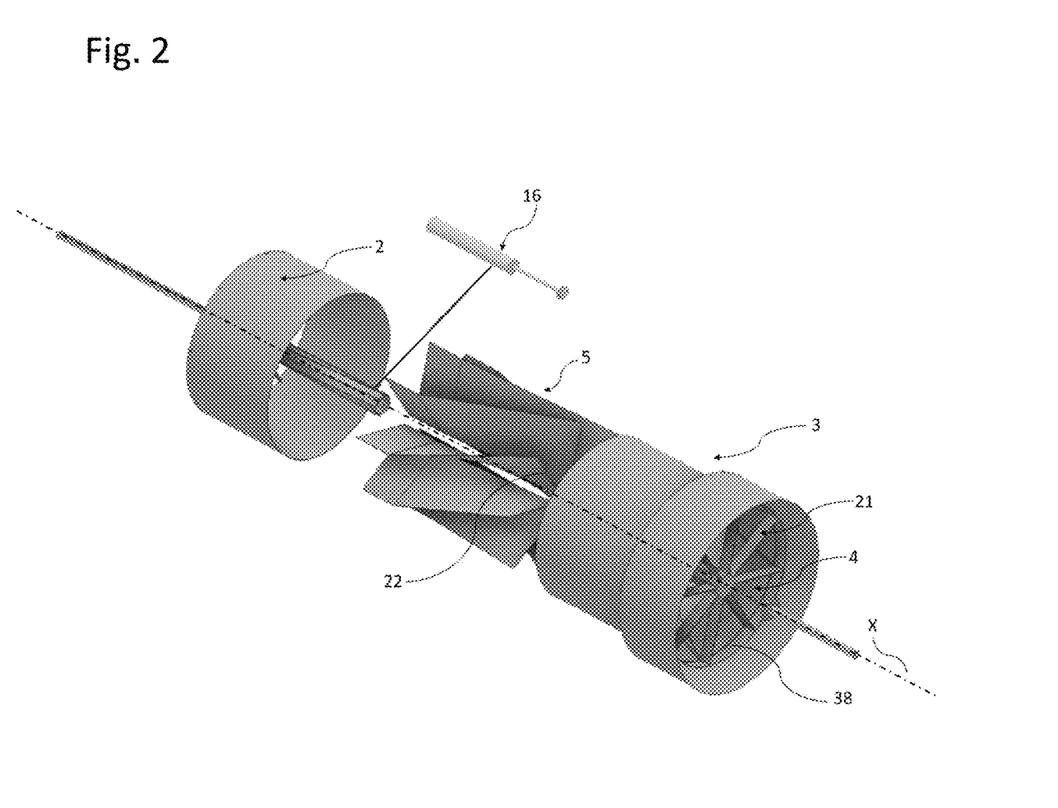
FIG. 2 is a further perspective, exploded view of the impeller of FIG. 1 according to a different angle.
Figure 6:
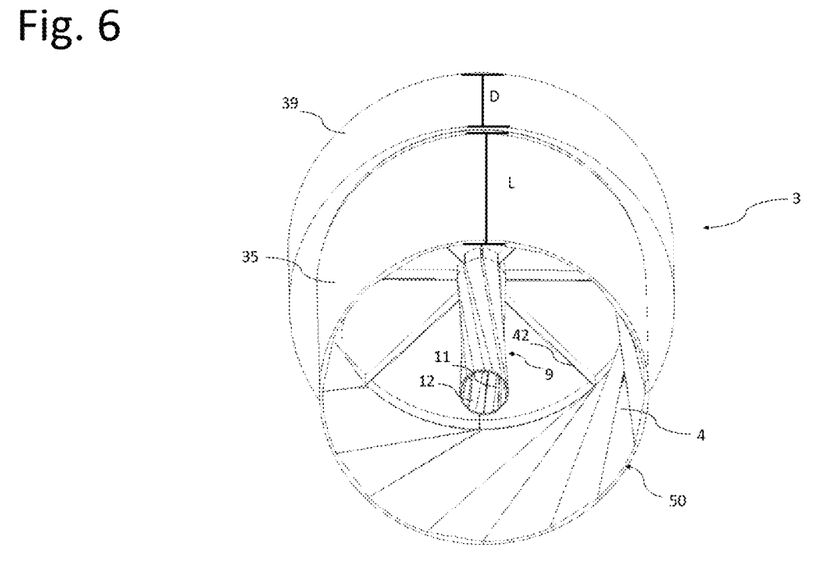
FIG. 6 is a perspective rear view of the detail of FIG. 5.

As shown in FIG. 1, the front ring 3 comprises a front portion 39 and a rear wall 50. The front portion 39 has a cylindrical shape and has substantially the same diameter as the larger section 31 of the converging portion 30. The rear wall 50 comprises an inner peripheral surface 4 and an outer peripheral surface 35. The outer peripheral surface 35 has a cylindrical shape and has substantially the same diameter as the cylindrical portion 38. The inner peripheral surface 4 is opposite with respect to the outer peripheral surface 35. Furthermore, the inner peripheral surface 4 comprises a plurality of flat surfaces 25, alternated with intermediate surfaces 34 which can have a different geometry, for example portions of cylinder side surfaces. As shown in FIG. 6, generally the rear wall 50 has a dimension L in the direction of the central axis X, which is larger with respect to a dimension D in the direction of the central axis X of the front portion 39.

Figure 4:
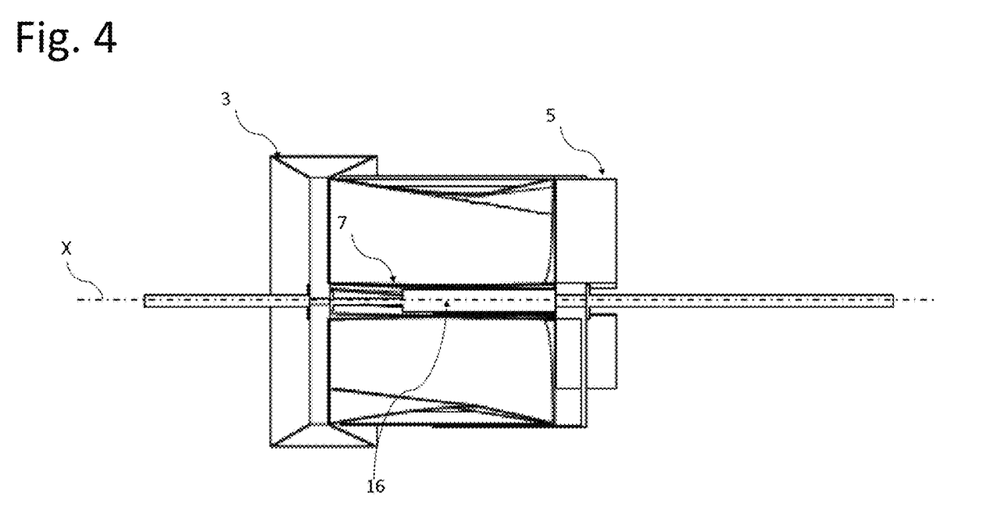
FIG. 4 is a sectional side view of the impeller of FIGS. 1 and 2.

It should be noted that the impeller 1 comprises a shaft 7, shown in FIG. 4, which extends along the central axis X. The shaft 7 comprises a rear portion 8, connected to the rear ring 2, and a front portion 9, connected to the front ring 3. More details on the shaft 7 will be provided later in the present description.

The front ring 3 comprises a plurality of front radial elements 21, shown in FIG. 5. Each front radial element 21 comprises a first end 40 fixed to the front portion 9 of the shaft 7 and a second end 41, connected to the cylindrical portion 38 of the inner peripheral surface 4. Furthermore, each radial element 21 comprises a rear edge 42, shown in FIG. 6, identified as the edge facing the rear ring 2.

Figure 7:
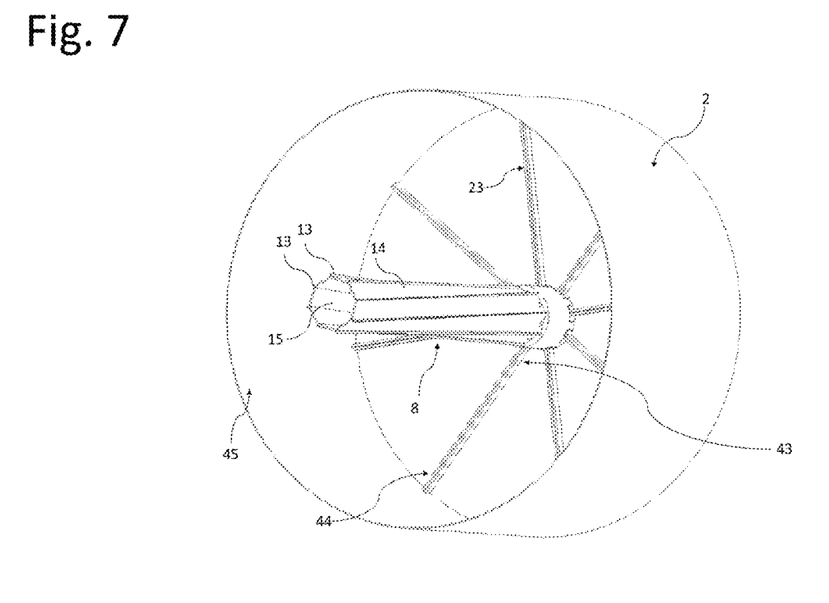
FIG. 7 is a perspective view of a second detail of the impeller of FIGS. 1 and 2.

Referring now to the rear ring 2, shown in FIG. 7, it has a cylindrical shape and comprises an inner surface 45. Furthermore, the rear ring 2 extends along the central axis X, passing through the centre of the rear ring 2. The front ring 3 is arranged coaxially with respect to the rear ring 2. The rear ring 2 has a larger diameter of the rear wall 50 and a smaller diameter of the front portion 39 of the front ring 3.

Figure 8:
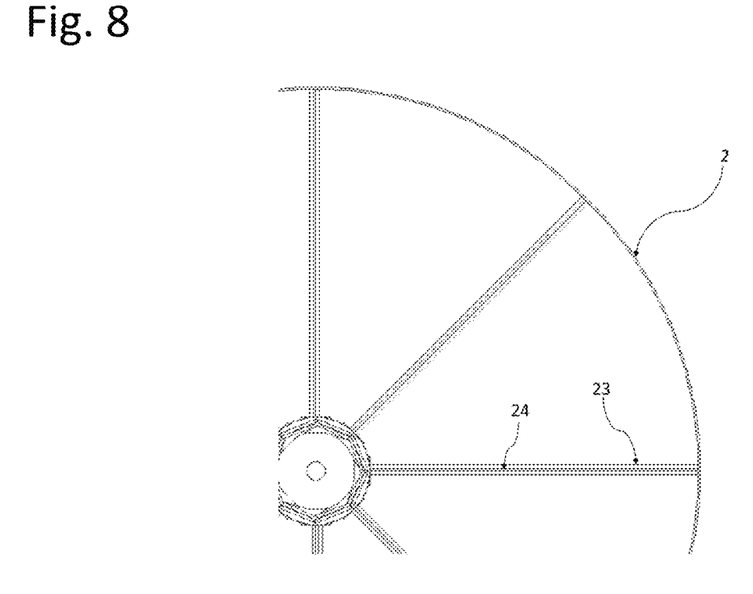
FIG. 8 is an enlarged front view of a third detail of the impeller of FIGS. 1 and 2.

The rear ring 2 comprises a plurality of rear radial elements 23. Each rear radial element 23 comprises a first end 43 fixed to the rear portion 8 of the shaft 7 and a second end 44 connected to the inner surface 45 of the rear ring 2. Furthermore, each radial element 23 comprises a slot 24, shown in detail in FIG. 8. The distance between two consecutive radial elements is greater than the width of the slot 24.

As shown in FIG. 1, the impeller 1 comprises a plurality of blades 5, preferably eight, connected to the front ring 3. The number of front radial elements 21 and rear radial elements 23 corresponds to the number of blades 5. The blades 5 define a variable-pitch propeller 6. Each blade 5 has an outer edge 26, an inner edge 20 and a front edge 22, shown in FIG. 1. The outer edge 26 is in contact with a respective flat surface 25 of the inner peripheral surface 4. The inner edge 20 is in contact with the shaft 7 of the impeller. The front edge 22 is identified as the edge of each blade 5 closest to the entrance of the incident air flow. The front edges 22 of each blade 5 are hinged with a respective rear edge 42 of the front radial elements 21.

In greater detail, each blade has a main body 47 and a tail portion 46. The tail portion 46 forms an angle with the main body 47. Each tail portion 46 is inserted inside a respective slot 24 of the rear radial elements 23. Furthermore, as shown in FIG. 1, the tail portion 46 has an intermediate edge 32, identified between the tail portion 46 and the main body 47 of the blade 5, and a rear edge 37, opposite with respect to the front edge 22.

It should be noted that the front 9 and rear 8 portions of the shaft 7 have, respectively, a front cavity 10 and a rear cavity 15, shown respectively in FIG. 1 and FIG. 7. The front cavity 10 and the rear cavity 15 extend along the central axis X. The rear portion 8 of the shaft 7 is inserted inside the front cavity 10 at least partially.

It should be noted that the front portion 9 of the shaft 7 has an inner surface 12, shown in FIG. 6, on which at least one spiral guide 11 is comprised. The rear portion 8 comprises an outer surface 14, shown in FIG. 7, on which there is at least one slider 13, associated with the spiral guide 11 of the front portion 9. The front portion 9, shown in FIG. 5, has an outer surface 18, on which a plurality of flat surfaces 19 are present. The flat surfaces 19 of the front portion 9 are alternated with side surfaces 36 which can have a different geometry, for example portions of cylinder side surfaces. Furthermore, each flat surface 19 of the front portion 9 is in contact with a respective inner edge 20, shown in FIG. 1, of a blade 5.

It should be noted that the front ring 3 is slidably associated with the rear ring 2 and switches with respect to the rear ring 2 along the central axis X between a close configuration and a spaced apart configuration. Indicatively, the maximum stroke of the front ring 3 with respect to the rear ring 2 is in the order of ten centimetres along the central axis X. When the front ring 3 reversibly changes configuration, the rear ring 2 is inserted between the rear wall 50 and the front portion 39. Furthermore, by varying the configuration of the front ring 3, it is possible to adjust the orientation of the blades 5 between a minimum pitch, when the front ring 3 in the close configuration, and a maximum pitch, when the front ring 3 is in the spaced apart configuration.

When the front ring 3 changes its configuration, the blades 5 are adjusted. The hinge between each front edge 22 of the blades 5 and a respective rear edge 42 of the front radial elements 21 allows the main body 47 of the blades 5 to tilt, changing the pitch of the propeller 6, optimizing the air flow. When the blades 5 are adjusted, the outer edge 26 and the inner edge 20 slide respectively on the respective flat surface 25 of the inner peripheral surface 4 and on the flat surface 19 of the front portion 9. The edges 26 and 20 slide in the same direction and maintain contact with the respective flat surfaces 25 and 19. Furthermore, each tail portion 46 of the blade 5 can slide into the respective slot 24 in a portion between the intermediate edge 32 and the rear edge 37.

It should be noted that the front portion 9 of the shaft 7 is configured to rotationally translate with respect to the rear portion 8, reversibly switching the front ring 3 between the close configuration and the spaced apart configuration. Advantageously, by associating the slider 13 of the rear portion 8 with the respective spiral guide 11 of the front portion 9, a controlled rotational translation of the rear portion 8, and consequently of the front ring 3, is allowed. Furthermore, each inner edge 20 is slidable along the flat surface 19 of the front portion 9 during the switching of the front ring 3 between the close configuration and the spaced apart configuration.

It should be noted that the impeller 1 comprises an actuator 16, shown in FIG. 1 and FIG. 4, inserted inside the front 10 and rear 15 cavities. The actuator 16 comprises a fixed end 17 inserted in the rear cavity 15 of the rear portion 8 and a movable end 18 inserted in the front cavity 10 of the front portion 9. In use, the actuator 16 is operated and switched between a contracted configuration, for switching the front ring 3 into a close configuration, and an extended configuration, for switching the front ring 3 into a spaced apart configuration.

Figure 9:
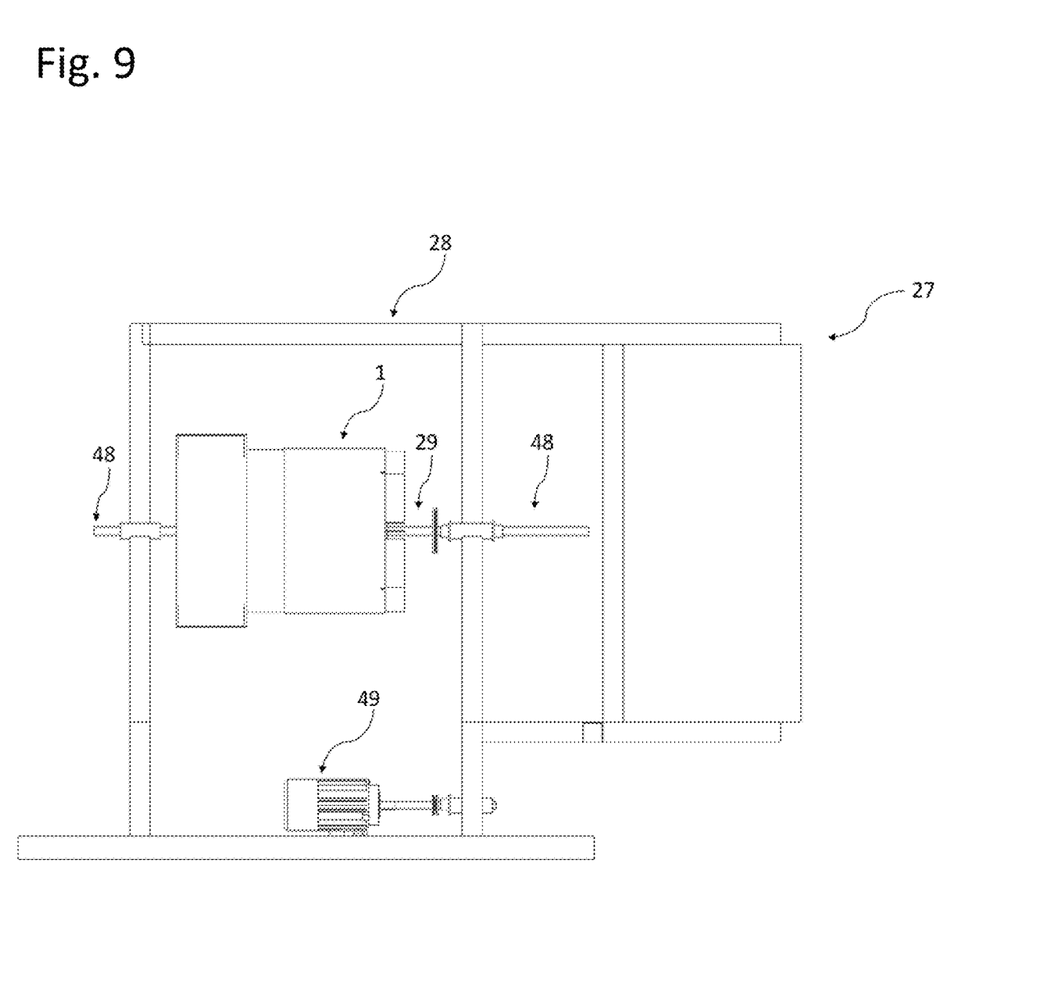
FIG. 9 is a schematic side view of a turbine according to the present disclosure.

It should be noted that the impeller 1 described above is connectable to a wind turbine 27, shown in FIG. 9, which comprises a frame 28, transmission means 29 and an alternator 49. In particular, the transmission means 29 can include a rotor shaft 48. The rear ring 2 is fixed along the central axis X and connected to the transmission means 29.

The invention claimed is:

1. An impeller for wind turbines comprising:
   a rear ring having a central axis;
   a front ring having an inner peripheral surface; the front ring being arranged coaxially with respect to the rear ring; the front ring being slidably associated with the rear ring and movable along the central axis between a close configuration and a spaced apart configuration with respect to the rear ring;
   a plurality of blades connected to the front ring and defining a variable-pitch propeller, the blades being adjustable between a minimum pitch when the front ring is in the close configuration and a maximum pitch when the front ring is in the spaced apart configuration;
   a shaft extending along the central axis; the shaft comprising a rear portion connected to the rear ring and a front portion connected to the front ring; the front portion of the shaft being configured to perform a rotational translation movement with respect to the rear portion to switch the front ring between the close configuration and the spaced apart configuration; the front portion of the shaft having a front cavity extending along the central axis; the rear portion of the shaft being at least partially inserted in the front cavity,
   wherein the front portion comprises at least one spiral guide arranged on an inner surface of the front portion; the rear portion comprising at least one slider associated with the spiral guide and arranged on an outer surface of the rear portion.

2. The impeller according to claim 1, wherein the rear portion of the shaft has a rear cavity extending along the central axis; the impeller comprises an actuator inserted inside the cavities; the actuator comprising a fixed end connected to the rear ring and a movable end connected to the front ring; the actuator being operable to reversibly switch the rings between the close and spaced apart configurations.

3. The impeller according to claim 1, wherein the front portion has an outer surface; the outer surface of the front portion having a plurality of flat surfaces; each blade having an inner edge placed in contact with a respective flat surface of the plurality of flat surfaces of the front portion.

4. The impeller according to claim 1, wherein the front ring comprises a plurality of front radial elements connected to the front portion; each blade having a front edge hinged to a respective front radial element of the plurality of front radial elements.

5. The impeller according to claim 1, wherein the rear ring comprises a plurality of rear radial elements; each rear radial element having a slot; each blade being slidably inserted in a respective slot of the plurality of slots.

6. The impeller according to claim 1, wherein the inner peripheral surface of the front ring has a plurality of flat surfaces; each blade having an outer edge placed in contact with a respective flat surface of the plurality of flat surfaces of the inner peripheral surface.

7. A wind turbine comprising a frame, transmission means and an impeller according to claim 1; the rear ring of the impeller being connected to the transmission means and being fixed along the central axis.

\* \* \* \* \*